July 26, 1927.
B. A. FUEGLEIN
DISPLAY CARD
Filed Feb. 20, 1926
1,636,991
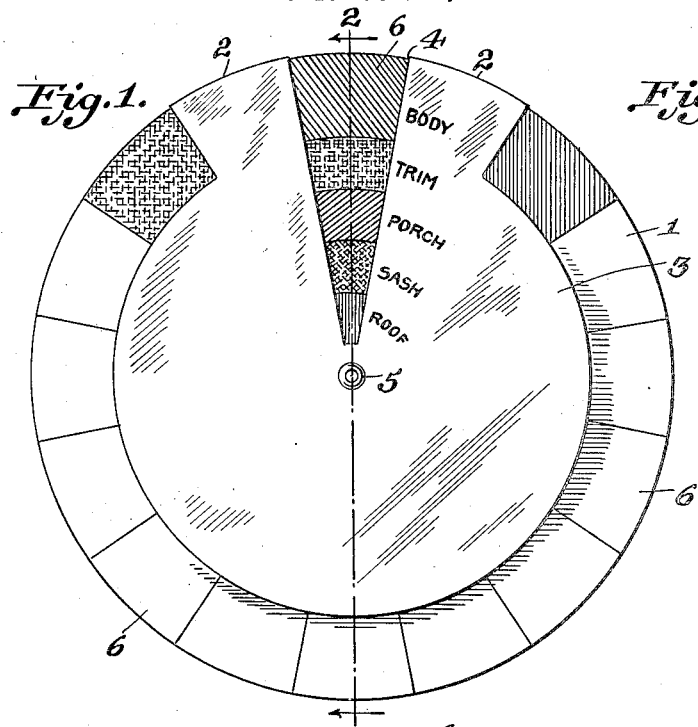
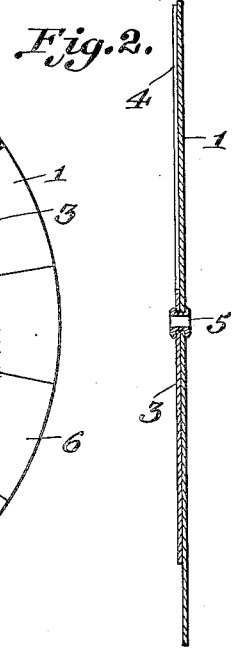
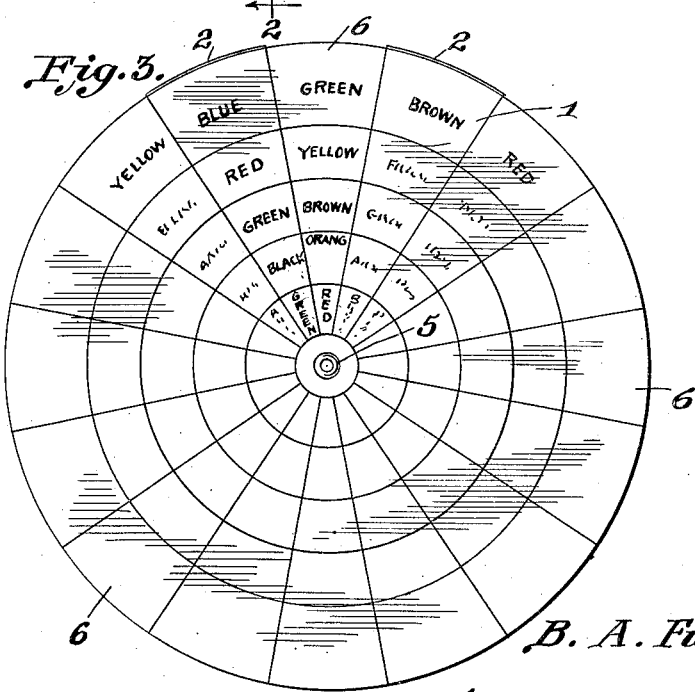
Inventor
B. A. Fueglein
By Mason Fenwick & Lawrence
Attorneys Patented July 26, 1927.

1,636,991

UNITED STATES PATENT OFFICE.

BERNARD A. FUEGLEIN, OF LOUISVILLE, KENTUCKY.

DISPLAY CARD.

Application filed February 20, 1926. Serial No. 89,729.

This invention relates to improvements in display cards suitable for showing certain color combinations in connection with the interior and exterior of a house.

The primary object of the invention is to provide a novel method whereby a person desiring to gain some idea before-hand as to how certain colors will look in combination with each other, may acquire this knowledge by placing colors in such relationship in a new and novel manner. This color scheme, using the interior of a house as an example, will show the color of the ceiling, woodwork, floor and panelling; using the exterior of a house as an example, the body, trim, porch, sash and roof in contrast to each other.

With the above and other objects in view, the invention consists in certain novel combinations and arrangements of parts to be hereinafter more fully described and claimed.

Reference is had to the accompanying drawing forming a part of this specification, in order to demonstrate the preferred embodiments of the invention, in which:

Figure 1 is a top plan view of the display card;

Figure 2 is a vertical section taken through lines 2—2 of Figure 1; and

Figure 3 is a plan view showing the reverse side of the card shown in Figure 1.

Referring to the drawing in detail, in which like reference characters designate corresponding parts throughout the several views, 1 designates a circular disc composed of sections 6 which are in turn composed of a number of colors so selected as to blend properly with different portions of a house, such as the body, trim, porch, sash and roof. Each section 6 is composed of a different color combination, the color nearest the rim being the basic color, the other colors selected being colors that will harmonize with the basic color and yet be such a proper color that it can be used on the object designated.

On the reverse side of the card 1, as shown in Figure 3, are sections corresponding to the sections 6 described on the top side. These sections, instead of showing colors, contain the names of the colors shown on the top side and enable the user, after selecting his color on the top side, to reverse the card and ascertain the names of the color or colors desired.

Pivotally attached to the under disc 1 by pivot 5, is a disc 3. This disc is smaller in diameter than the other disc and contains a V-shaped slot 4 in the form of a removed section. Adjoining the removed section on the other side, are shoulders 2 which project slightly beyond the under disc 1. The rest of the top disc 3 is so arranged as to expose the outermost color in each section of the under disc 1. The shoulders 2 serve to blot out the entire color section immediately adjoining the open section 4 of the top disc, thus the user has no conflicting colors to interfere with the color combination which is exposed through the removed section for his selection.

In operation, the user will select the basic color desired from the exposed colors on the outermost section of the under disc. He will then revolve the top disc 3 by means of shoulders 2 which project slightly beyond the under disc until the desired color rests between the two shoulders, thus exposing to the view of the user the desired color combination. Along the sides of the different colors are designated the places where these colors are to be used and hence a very accurate contrast may be obtained by the user. This operation may be repeated until the desired combination of colors has been selected. On selecting the combination, the names of the colors constituting the combination may be ascertained by reading the reverse side of the under disc. The name of the color being found on the section corresponding to the color on the top disc.

This invention, although described in connection with a house is in no way limited to such use, but may be used wherever colors are going to be used in contrast or in combination with each other.

Having described my invention, I claim as new:

1. A display card, consisting of an upper and lower disc, the upper disc being smaller than the lower disc and containing a segmental aperture, shoulders on each side of the aperture, the said shoulders projecting beyond the under disc, said lower disc being divided into segmental sections, each section subdivided into different color sections, embodying a color scheme, the reverse side divided into segmental sections, each such section which is sub-divided into segmental sections corresponding to the segmental sections on the front side, each segmental section divided into sub-sections bearing indicia of colors, the indicia corresponding to the colors on the front side, the projecting shoulders on the front side indicating the aperture in the upper disc.

2. A display card consisting of an upper and lower disc concentrically pivoted to each other, the lower disc having colored sections on one side, the reverse side divided into corresponding sections with indicia of color, the said indicia corresponding to the color on the obverse side, the upper disc provided with a segmentary cut away section, shoulders projecting from said upper disc on each side of the said section, said shoulders projecting beyond the under disc and indicating the location of said section in the upper disc relative to the reverse side of the lower disc.

3. A color selector card comprising a disk having one face divided into equal sectors, each of which is subdivided by concentric complementary color sections differently colored from the sections in the remaining sectors; the reverse side of said disk being divided and subdivided by similarly arranged sectors and sections of the same size as those on the face of said disk, and each section on the reverse side having indicia corresponding to the color of the section on the face directly opposite to it; and an indicator disk rotatable on the face of said disk and having a sector cut away to expose all color sections in any selected colored sector and to obscure the sectors on each side of said selected sector.

In testimony whereof I affix my signature.

BERNARD A. FUEGLEIN.